United States Patent [19]

Mercer

[11] Patent Number: 4,706,181

[45] Date of Patent: Nov. 10, 1987

[54] SWITCHING CONVERTER WITH ENHANCED VOLTAGE CLAMPING AND ENERGY RECOVERY

[75] Inventor: Larry N. Mercer, Bountiful, Utah

[73] Assignee: Unisys Corporation, Blue Bell, Pa.

[21] Appl. No.: 10,067

[22] Filed: Feb. 2, 1987

[51] Int. Cl.⁴ .......................................... H02M 7/538
[52] U.S. Cl. .................................... 363/133; 363/134; 363/24
[58] Field of Search ....................... 363/22, 23, 24, 25, 363/26, 133, 134, 139

[56] References Cited

U.S. PATENT DOCUMENTS 3,843,919 10/1974 Yamamura et al. ................. 363/25

Primary Examiner—Patrick R. Salce
Assistant Examiner—Jeffrey Sterrett
Attorney, Agent, or Firm—Glenn W. Bowen; Laurence J. Marhoefer

[57] ABSTRACT

A power converter is provided with a pair of auxiliary windings coupled to the primary windings of the output transformer which serve as energy choke windings. An additional pair of choke windings are coupled between the input of the converter to a common terminal of the primary winding. These choke windings prevent excess voltage from appearing across the switching devices of the converter during the turn-off portions of the cycle.

2 Claims, 1 Drawing Figure

SWITCHING CONVERTER WITH ENHANCED VOLTAGE CLAMPING AND ENERGY RECOVERY

BACKGROUND OF THE INVENTION

Historically push-pull D.C. to A.C. power converters have been plagued with crossover problems when both bipolar switching transistors are on during a half cycle. Field effect transistors have contributed substantially to the elimination of this problem, but it may still occur when the secondary of the power transformer is heavily loaded with capacitance or the interwinding capacitance is substantial. In these cases, the level of the switching current during turn-on becomes much higher than the level of the current during the remainder of the cycle.

The switching current is controlled, or minimized, in the present invention by the insertion of a choke winding in the center tap of the transformer. Energy stored in the choke winding prevents excessive voltage from appearing across the switches during the turn-off portions of the cycle. In addition, the leakage inductance energy of the primary of the transformer is returned to a storage capacitor to raise the efficiency of the converter.

BRIEF DESCRIPTION OF THE DRAWING

The FIGURE shows a schematic of the present invention.

TECHNICAL DESCRIPTION OF THE INVENTION

Figure 1:
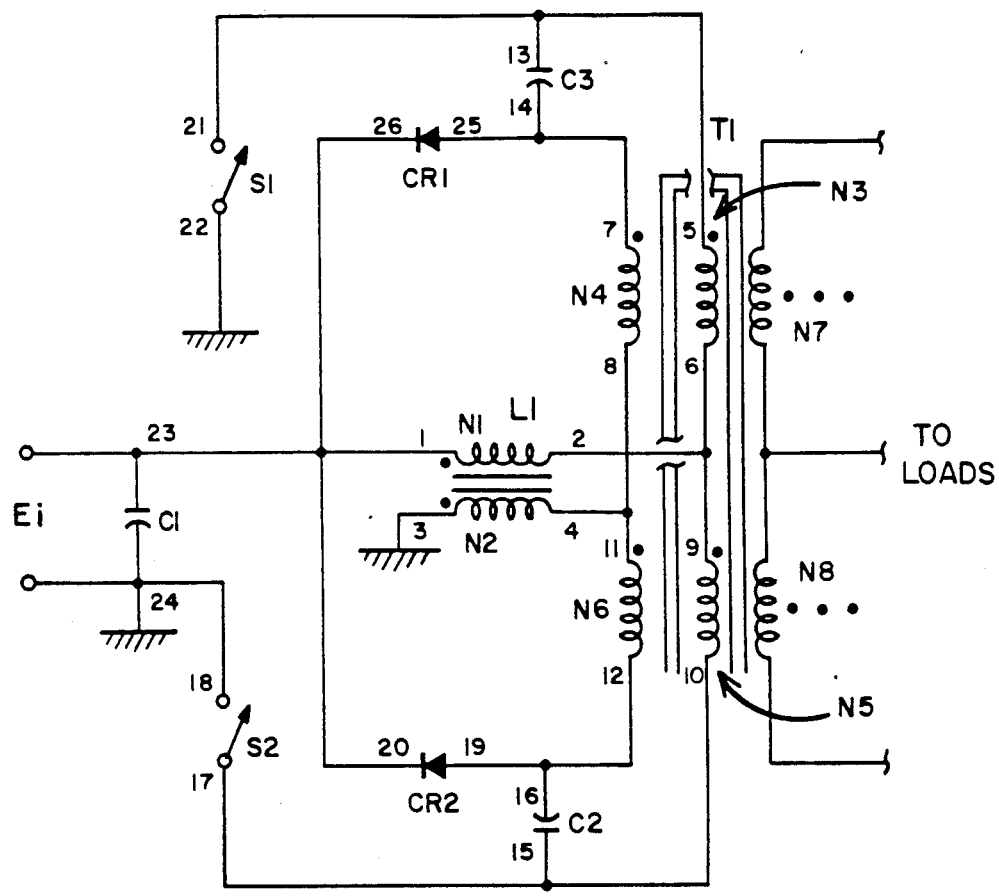

The present invention is described by reference to the FIG. in which the transformer T1 consists of the secondary windings N7, N8, the primary windings N3, N5, and two additional windings N4, N6 which are used as catch windings, or energy storage windings. The choke L1 contains the inductor winding N1 and a second winding N2, which is inductively coupled to the N1 winding, and is also used as a catch winding. The dot convention is used to show the relative polarity of each winding in the figure.

The input voltage $E_i$ to the circuit is applied across the capacitor C1, one plate of which is coupled to the winding N1 and the other plate of which is grounded. The windings N4 and N6 are connected to one plate of the capacitors C3 and C2, and to the anodes of the diodes CR1 and CR2 respectively. The cathodes of the diodes CR1 and CR2 are coupled to the capacitor C1, while the other plates of capacitors C3 and C4 are respectively coupled to the switches S1 and S2. The other end of these switches are connected to ground.

Switches S1 and S2 alternately open and close in cyclic patterns, as is conventional for power conversion circuits. To understand the operation of the circuit, it may first be assumed that S1 and S2 are both open circuited. The voltage across all the windings will then be zero. That is:

$$E(1-2) = E(3-4) = E(5-6) = E(7-8) = E(9-10) = E(11-12) = 0,$$

where E represents voltage and the numbers in the parenthesis indicate the terminals across which a voltage drop occurs.

For this to be true, the voltage across C2 and C3 must be equal to the D.C. input voltage $E_i$.

That is:

$$E(13-14) = E(15-16) = E_i.$$

If it is assumed that both S1 and S2 are now closed, then the voltage across N3, N4, N5, and N6 will go to zero.

Thus:

$$E(5-6) = E(7-8) = E(9-10) = E(11-12) = 0,$$

The voltage across the windings N1 and N2 then becomes:

$$E(1-2) = E_i \text{ and}$$

$$E(4-3) = -E_i,$$

since the plates of the capacitors C2 and C3 which are connected to the anodes of the diodes CR1 and CR2, will then be at a $-E_i$ level.

The voltage at points 13 and 15 will then be at ground potential which results in points 4, 14 and 16 initially being at $-E_i$. Because of the winding N2, the discharge of the capacitors C2 or C3 is dissipated, or damped, by the parallel connected windings N2, N4 for switch S1, and the windings N2, N6 for switch S2. The current through the switches S1 and S2 may thus be essentially limited to the amount of current flowing through the windings N1, N3 for switch 1 and the windings N1, N5 for switch S2.

For the conditions where S1 is open circuited and S2 is closed, the voltage across the windings N3, N4, and N6 will be equal to the input voltage less the voltage dropped across the winding N1. That is:

$$E(5-6) = E(7-8) = E(9-10) = E(11-12) = E_i - E(1-2),$$

when a 1 to 1 turn ratio exists between the windings N3, N4 and the windings N5, N6, respectively.

Summing the voltages around all the loops yields:

$$E(1-2) + E(9-10) = E_i, \quad (1)$$

and $$E(1-2) + E(6-5) + E(13-14) + E(7-8) + E(4-3) = E_i \quad (2)$$

therefore, $$E(13-14) = E(9-10) - [E(4-3) + E(7-8) + E(6-5)]; \quad (3)$$

which shows that the voltage across the capacitor C3 is limited in this case by the current flowing in the winding N1.

In the case where S1 has been open circuited for a half cycle, and S2 has just opened, energy stored in the N1 and N5 windings causes the voltage to rapidly rise to a level that could be excessive for switch S1. This is prevented by the diode CR2 which becomes forward biased and thereby limits the transient voltage across the switch to approximately $2E_i$.

That is:

$$E(18-17) = E_i + E(15-16) + E(19-20).$$

The energy stored in the windings N1 and N5, in this case, is passed to the capacitors C1 and C2. Since the energy is supplied from one reactive element to another, the losses are minimized. There will be some energy lost in the diode and the inherent resistances of the windings, but the losses are negligible compared to resistor-capacitor-diode snubbing.

The energy stored in the capacitors C1 and C2 will be transferred to the load during the next half cycle when S1 is open. Analogous operation results when S2 has been open circuited for a half cycle and S1 is opened. The particular timing of the opening and closing of the switches S1 and and S2 is not critical to the present invention.

I claim:

1. A power converter comprising
reference level means,
means for supplying D.C. input power across first and second input terminals, wherein said second input terminal is coupled to said reference level means,
secondary output winding means for supplying power output from said power converter,
first and second primary windings each having first and second primary terminals, said first primary terminals being coupled together to form a common primary terminal,
first auxiliary winding means inductively coupled to said first primary winding means having first and second auxiliary terminals and being wound with the same winding polarity as said first primary winding means,
second auxiliary winding means inductively coupled to said second primary winding means and having third and fourth auxiliary terminals and being wound with the same winding polarity as said second primary winding means, wherein said second and fourth auxiliary terminals are coupled together to form a common auxiliary terminal and said first and second auxiliary winding means are wound with opposite winding polarities relative to each other with respect to said common auxiliary terminal,
first choke winding means having first and second choke terminals wherein said first choke terminal is coupled to said first input terminal and said second choke terminal is coupled to said common primary terminal,
second choke winding means inductively coupled to said first choke winding having a third and fourth choke terminals, wherein said third choke terminal is coupled to said second input terminal and said fourth choke terminal is coupled to said common auxiliary terminal, said first and second choke winding means being wound with the same winding polarity,
first capacitive means coupled between said second primary terminal of said first primary winding and said first auxiliary terminal,
second capacitive means coupled between said second primary terminal of said second primary winding and said third auxiliary terminal,
first electrical switch means having at least first and second switch terminals coupled between said second primary terminal of said first primary winding and said reference level means,
and second electrical switch means is coupled beteen said second primary terminal of said second primary winding means and said reference level means.

2. A power converter as claimed in claim 1 further comprising first and second diode means both having their cathodes coupled to said first input terminal, the anode of said first diode means being coupled to said first auxiliary terminal and the anode of said second diode means being coupled to said third auxiliary terminal.

* * * * *